US011405483B2

(12) United States Patent
Hoshino

(10) Patent No.: US 11,405,483 B2
(45) Date of Patent: Aug. 2, 2022

(54) RELAY DEVICE AND NON-TRANSITORY COMPUTER READABLE MEDIUM STORING PROGRAM

(71) Applicant: FUJIFILM Business Innovation Corp., Tokyo (JP)

(72) Inventor: Haruhisa Hoshino, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 326 days.

(21) Appl. No.: 16/299,151

(22) Filed: Mar. 12, 2019

(65) Prior Publication Data

US 2019/0297166 A1 Sep. 26, 2019

(30) Foreign Application Priority Data

Mar. 20, 2018 (JP) .............................. JP2018-052880

(51) Int. Cl.
| | |
|---|---|
| *H04L 67/306* | (2022.01) |
| *G06F 21/45* | (2013.01) |
| *H04L 67/10* | (2022.01) |
| *H04B 7/155* | (2006.01) |
| *H04L 9/40* | (2022.01) |

(52) U.S. Cl.
CPC ............ *H04L 67/306* (2013.01); *G06F 21/45* (2013.01); *H04B 7/155* (2013.01); *H04L 67/10* (2013.01); *H04L 63/083* (2013.01); *H04L 63/0861* (2013.01)

(58) Field of Classification Search
CPC ... H04L 63/083; H04L 63/0861; H04L 67/10; H04L 67/306; H04B 7/155; G06F 21/45
See application file for complete search history.

(56) References Cited

U.S. PATENT DOCUMENTS

| | | | |
|---|---|---|---|
| 2014/0007199 A1* | 1/2014 | Ishino ..................... H04L 63/10 726/4 |
| 2014/0164254 A1* | 6/2014 | Dimmick ............... G06Q 20/36 705/71 |
| 2015/0101023 A1* | 4/2015 | Shinoda .............. H04L 63/0807 726/4 |
| 2017/0180570 A1* | 6/2017 | Hirasawa ........... H04N 1/32625 |

FOREIGN PATENT DOCUMENTS

JP 5962261 8/2016

OTHER PUBLICATIONS

"Office Action of Japan Counterpart Application", dated Dec. 7, 2021, with English translation thereof, p. 1-p. 6.
"Office Action of Japan Counterpart Application", dated May 17, 2022, with English translation thereof, p. 1-p. 5.

\* cited by examiner

*Primary Examiner* — Brian P Cox
(74) *Attorney, Agent, or Firm* — JCIPRNET

(57) ABSTRACT

A relay device includes a receiving unit that receives image data from an image processing apparatus and a control unit that controls an update unit that updates log-in information to be generated in a cloud service device in a case where the received image data is transferred to the cloud service device, and the log-in information for the cloud service device is held.

9 Claims, 10 Drawing Sheets

FIG. 5

| CLOUD STORAGE | LOG-IN USER NAME | LOG-IN PASSWORD | ACCESS TOKEN | OTHERS |
|---|---|---|---|---|
| CLOUD STORAGE A | usera@aa.com | password 1 | Kr8px | ... |
| CLOUD STORAGE B | userb@aa.com | password 2 | Uejh8 | ... |
| ... | | | | |

| CLOUD STORAGE | LOG-IN USER NAME | LOG-IN PASSWORD | ACCESS TOKEN | OTHERS |
|---|---|---|---|---|
| CLOUD STORAGE A | usera@aa.com | password 1 | Kr8px | ... |
| CLOUD STORAGE B | userb@aa.com | password 2 | Uejh8 | ... |
| ... | | | | |

| CLOUD STORAGE | LOG-IN USER NAME | LOG-IN PASSWORD | ACCESS TOKEN | OTHERS |
|---|---|---|---|---|
| CLOUD STORAGE A | usera@aa.com | password 3 | Kr8uv | ... |
| CLOUD STORAGE B | userb@aa.com | password 2 | Uejh8 | ... |
| ... | | | | |

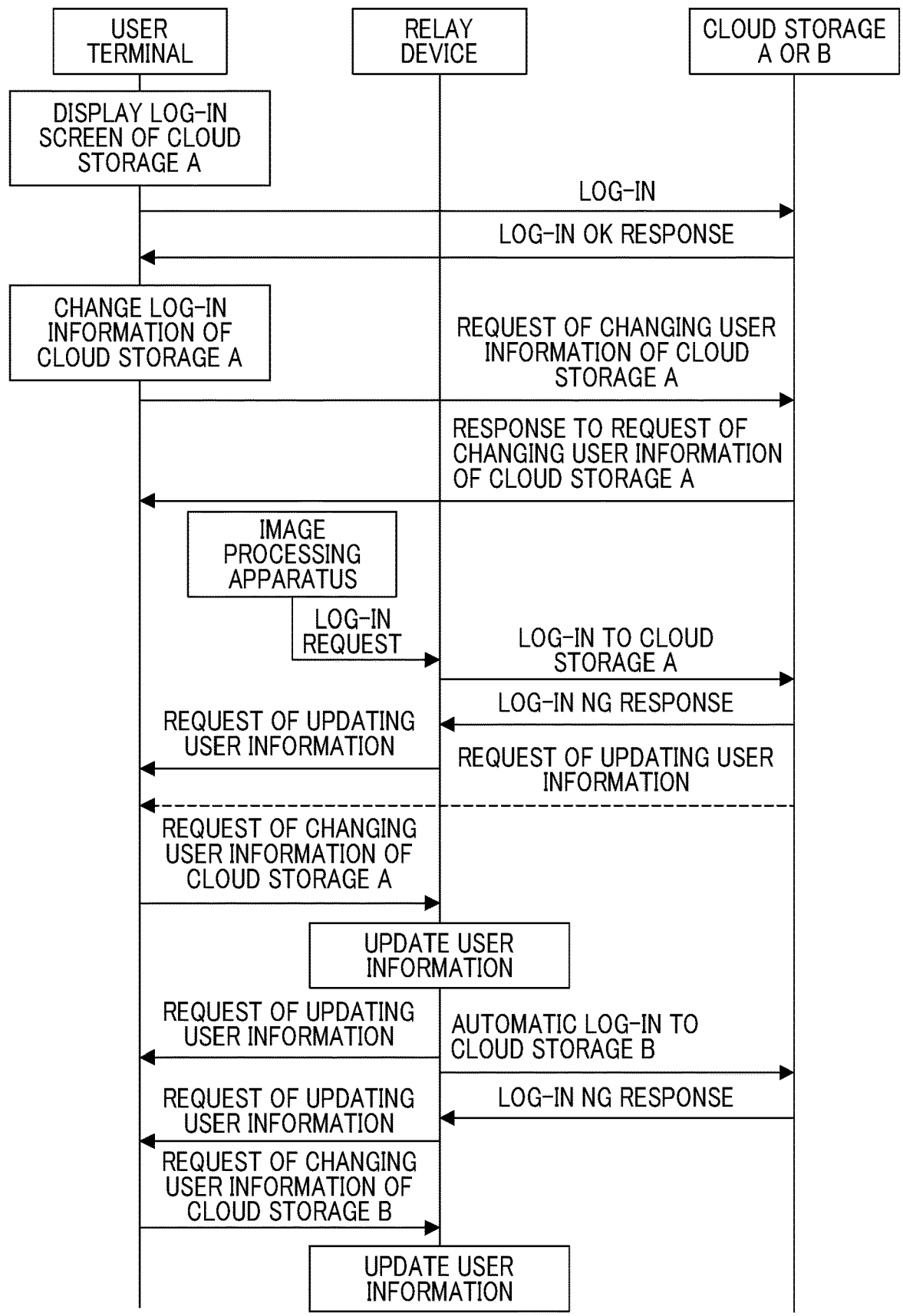

RELAY DEVICE AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2018-052880 filed Mar. 20, 2018.

BACKGROUND

(i) Technical Field

The present invention relates to a relay device and a non-transitory computer readable medium storing a program.

(ii) Related Art

JP5962261B discloses a relay device that relays data between a client device of a user and a service providing device without holding account information for the user using the service providing device. In a case where the user performs an operation of permitting log-in to a cloud service providing device by the relay device, a personal computer receives the operation and transmits a log-in permission response indicating that the user permits log-in, to the cloud service providing device. In a case where the cloud service providing device receives the log-in permission response, the cloud service providing device transmits an access token to the relay device. A control unit of the relay device stores the access token in association with a user ID. Thus, the relay device has an access authority for allowing an access to the cloud service providing device in place of the client device.

SUMMARY

From a viewpoint of ensuring security, a user may access a service providing device on a cloud (referred to as "a cloud service device" below) from a user terminal such as a personal computer (PC) without passing through a relay device and change log-in information. However, there is a problem in this case.

That is, in a system in which image data and the like are stored by accessing a cloud service device from an image processing apparatus such as a multifunctional device via a relay device, in a case where a user changes log-in information by using a user terminal, the log-in information or an access token held by the relay device is already invalid after the log-in information is changed. Thus, a situation in which it is not possible to access the cloud service device even though an attempt to access the cloud service device from the image processing apparatus via the relay device is performed occurs.

Aspects of non-limiting embodiments of the present disclosure relate to a relay device and a non-transitory computer readable medium storing a program.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a relay device which includes a receiving unit that receives image data from an image processing apparatus and a control unit that controls an update unit that updates log-in information to be generated in a cloud service device in a case where the received image data is transferred to the cloud service device, and the log-in information for the cloud service device is held.

BRIEF DESCRIPTION OF THE DRAWINGS

Exemplary embodiment(s) of the present invention will be described in detail based on the following figures, wherein:

FIG. 5 is a diagram illustrating a user information table in the exemplary embodiment;

FIG. 10 is a sequence chart of still another exemplary embodiment.

DETAILED DESCRIPTION

Hereinafter, exemplary embodiments of the present invention will be described with reference to the drawings.

Exemplary Embodiment 1

Figure 1:
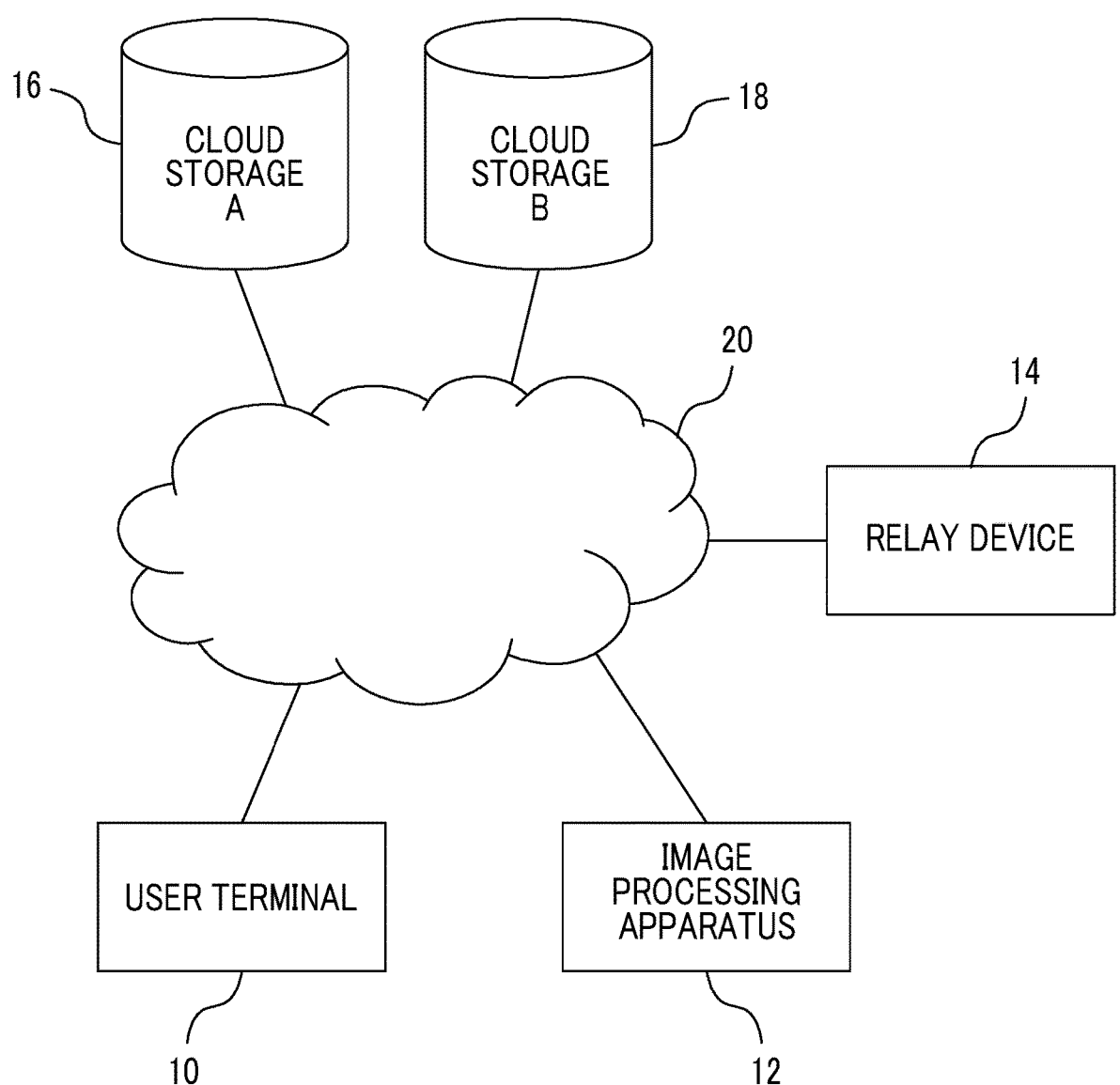
FIG. 1 is a diagram illustrating a system configuration according to an exemplary embodiment.

FIG. 1 is a diagram illustrating a system configuration according to an exemplary embodiment. A system includes a user terminal 10, an image processing apparatus 12, a relay device 14, a cloud storage A 16, and a cloud storage B 18. These components are connected to a communication network (cloud) 20 so as to be capable of transmitting and receiving data.

FIG. 1 illustrates the cloud storage A 16 and the cloud storage B 18 as an example of a plurality of cloud service devices. However, the number of cloud service devices is randomly determined and may be equal to or greater than 3. As an example of the cloud service device, a cloud storage that stores data is provided, and the invention is not limited thereto.

The user terminal 10 is a terminal operated by a user who wants a service provided by the cloud storage, for example, want to store image data. As the user terminal, a smart phone, a tablet terminal, a PC, or the like is provided. The user terminal 10 may transmit image data which is to be used for forming an image, as a print job, to the image processing apparatus 12. The user terminal 10 may directly access the cloud storage A 16 or the cloud storage B 18, if necessary.

The image processing apparatus 12 is, for example, a so-called multifunctional device including a scanning function, a printing function, a copying function, a facsimile function, and the like. The image processing apparatus 12 receives the image data transmitted from the user terminal 10 and performs printing processing, for example. A storing request of reading a document or the like from an auto-document feeder (ADF) or the like and storing image data thereof in a cloud storage is input to the image processing apparatus 12 by an operation of a user. The storing request includes information (user ID) for specifying a user, a designation information of a cloud storage, and the image data. For example, the user operates an operation screen displayed in a display unit of the image processing apparatus 12 to specify image data and input the name of a cloud storage and address information of the cloud storage. Then, the user operates a "store" button. The image processing apparatus 12 transmits the storing request including the user ID, the designation information of the cloud storage, and the image data, to the relay device 14.

In a case using the image processing apparatus 12, processing (log-in processing) of confirming that the user is an authorized user which has been previously registered is performed. For example, a user ID and a password may be received by a user operating a keyboard, and the user ID and the password may be compared to a user ID and a password which have been registered in advance. In addition, an IC card held by a user may be read out by using an IC card reader or the like, and information stored in the IC card may be compared to information which has been registered in advance. Biometric authentication of a fingerprint and the like may be used. The user ID included in the storing request may be the same as or different from a user ID at time of log-in.

The relay device 14 is configured by a server computer. The relay device receives the storing request transmitted from the image processing apparatus 12 and stores the image data in the cloud storage designated by the user. For example, in a case where a user designates the cloud storage A 16 as a storing destination of image data, the relay device 14 accesses the cloud storage A 16 by using log-in information (user authentication information) of the user for the cloud storage A 16, and then transfers the image data to the cloud storage A 16 and performs an instruction to store the image data. The log-in information (user authentication information) of the user for the cloud storage may be stored in the relay device 14 for each cloud storage.

The cloud storage A 16 or the cloud storage B 18 stores the image data transferred from the relay device 14. The cloud storage A 16 or the cloud storage B 18 may transmit the stored image data to the user terminal 10 in response to an access from the user terminal 10. In a case where the cloud storage A 16 or the cloud storage B 18 transmits (downloads) image data to the user terminal 10, the cloud storage A or the cloud storage B transmits the image data in a state where it has been confirmed that a user who has performed reading of the image processing apparatus 12 is the same as the user of the user terminal 10.

The communication network 20 is a local area network (LAN), a wide area network (WAN), or the like, and may be a wired or wireless network. The communication network 20 may be a private line or a public line such as the Internet. The communication network 20 may be configured by a plurality of networks.

As described above, the relay device 14 transfers image data from the image processing apparatus 12 to the cloud storage designated by a user and causes the cloud storage to store the image data. However, in a case where the user operates the user terminal 10 to access the cloud storage without passing through the relay device 14, and log-in information (user authentication information), for example, a password is updated from a viewpoint of improving security, log-in information (user authentication information) held by the relay device 14 does not coincide with the updated log-in information (user authentication information) after the log-in information has been updated. Thus, even though an attempt to access the cloud storage from the image processing apparatus 12 via the relay device 14 is performed, an access to the cloud storage is denied, and it is not possible to store image data.

Regarding this, in the exemplary embodiment, in a case where the user terminal 10 is operated to access the cloud storage without passing through the relay device 14 and to change log-in information (user authentication information), the relay device 14 performs processing of updating the log-in information (user authentication information) held in the relay device 14, in response to the change. The processing of updating the log-in information (user authentication information) includes processing of controlling the cloud storage to generate an update unit.

Figure 2:
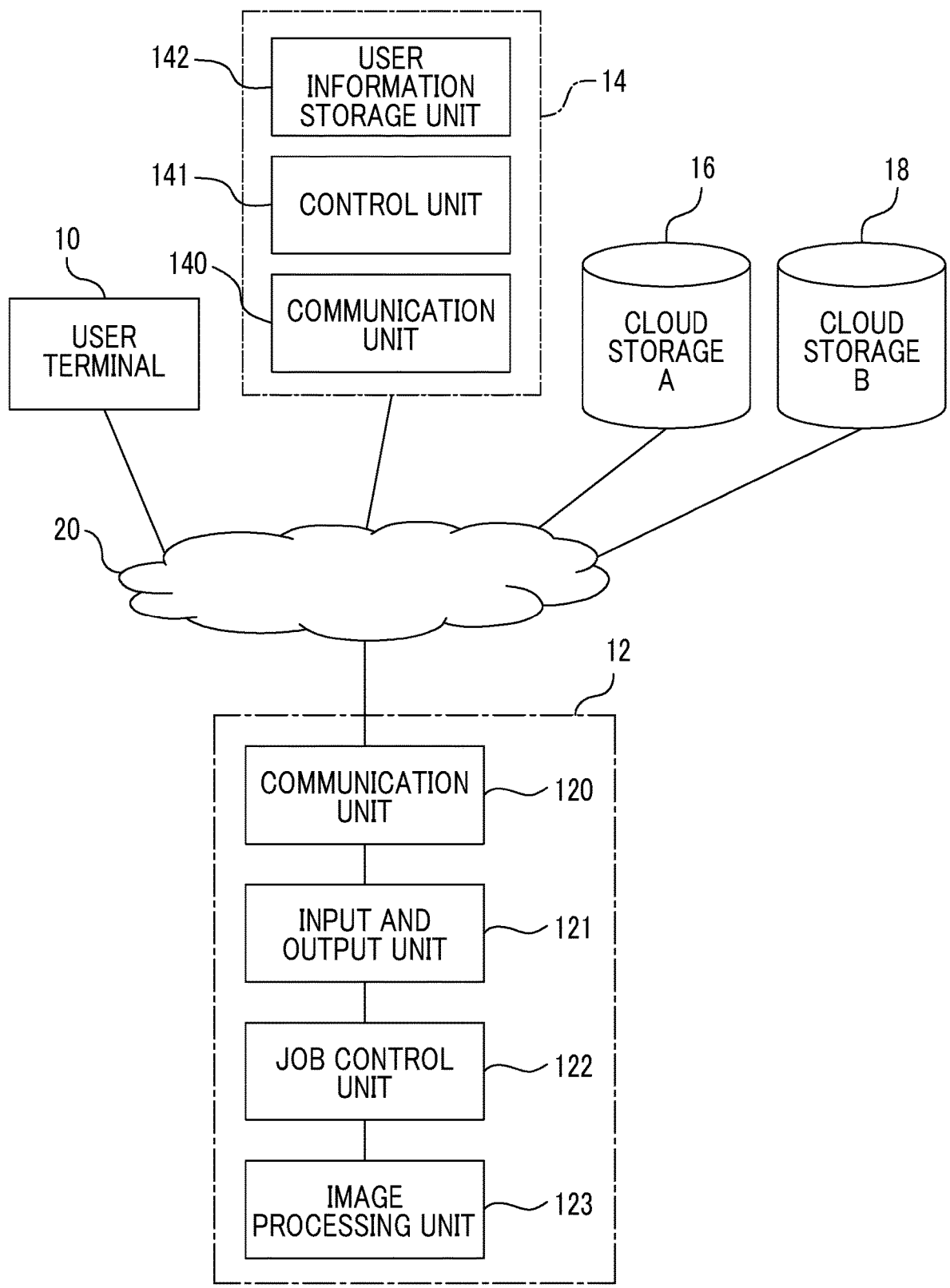
FIG. 2 is a functional block diagram illustrating an image processing apparatus and a relay device in the exemplary embodiment.

FIG. 2 is a functional block diagram illustrating the image processing apparatus 12 and the relay device 14. The image processing apparatus 12 includes a communication unit 120, an input and output unit 121, a job control unit 122, an image processing unit 123, a cloud selection control unit 124, and a rule storage unit 125 as functional blocks.

The communication unit 120 is connected to the input and output unit 121 and is connected to the user terminal 10, the relay device 14, the cloud storage A 16, and the cloud storage B 18 via the communication network 20 to be capable of communication. The communication unit 120 is an interface for communicating with another device such as the user terminal 10 via the communication network 20. For example, Ethernet (registered trademark), a universal serial bus (USB), or the like may be used.

The input and output unit 121 is connected to the communication unit 120 and the job control unit 122 so as to transmit a storing request including a user ID, designation information of a cloud storage, and image data to the relay device 14 via the communication unit 120 in response to an operation from a user.

The job control unit 122 controls an order of processing for a job processed by the image processing apparatus 12. For example, in a case where the image processing apparatus performs desired image processing on image data and then transmits the resultant to the cloud storage, the job control unit requests the image processing unit 123 to perform processing. Then, the job control unit transmits a processing result to the cloud storage.

The image processing unit 123 is connected to the job control unit 122, and performs various kinds of image processing by programs that perform image processing. Examples of image processing include noise removal, compression processing, format conversion, color conversion, and character recognition processing.

The relay device 14 includes a communication unit 140, a control unit 141, and a user information storage unit 142 as functional blocks.

The communication unit 140 is an interface for communicating with other devices such as the image processing apparatus 12 and the cloud storage A 16 via the communication network 20.

The control unit 141 includes a cloud access application programming interface (API) to transmit and receive information to and from the cloud storage. In a case where the cloud access API receives a storing request from the image processing apparatus 12, the cloud access API uploads an image data file to the cloud storage. The cloud access API is connected to the user information storage unit 142. The cloud access API reads log-in information (user authentication information) stored in the user information storage unit 142 and accesses the cloud storage, in response to the storing request from the cloud storage. The control unit 141 reads log-in information (user authentication information) corresponding to a user ID included in the storing request received from the image processing apparatus 12 with reference to an authentication table in which user authentication information associated with the user ID is stored. Then, the control unit 141 accesses the cloud storage.

The control unit 141 generates an update unit that updates the log-in information (user authentication information) on the cloud storage. For example, the update unit corresponds to an address display for updating the authentication table stored in the relay device 14. However, it is not limited thereto.

The control unit 141 updates the log-in information (user authentication information) recorded in the authentication table, in response to a request from the user terminal 10 or the like.

The user information storage unit 142 stores information of a cloud storage capable of being used by the user, and an authentication table for accessing the usable cloud storage. The authentication table includes a user name and a password, or an access token. For example, a set of the cloud service A as a usable cloud service, aaa as a log-in user name, * as a password, abcdef as an access token or a set of the cloud service B as the usable cloud service, aaa as the log-in user name, * as the password, uvwxy as the access token is stored in association with a certain user ID.

Figure 3:
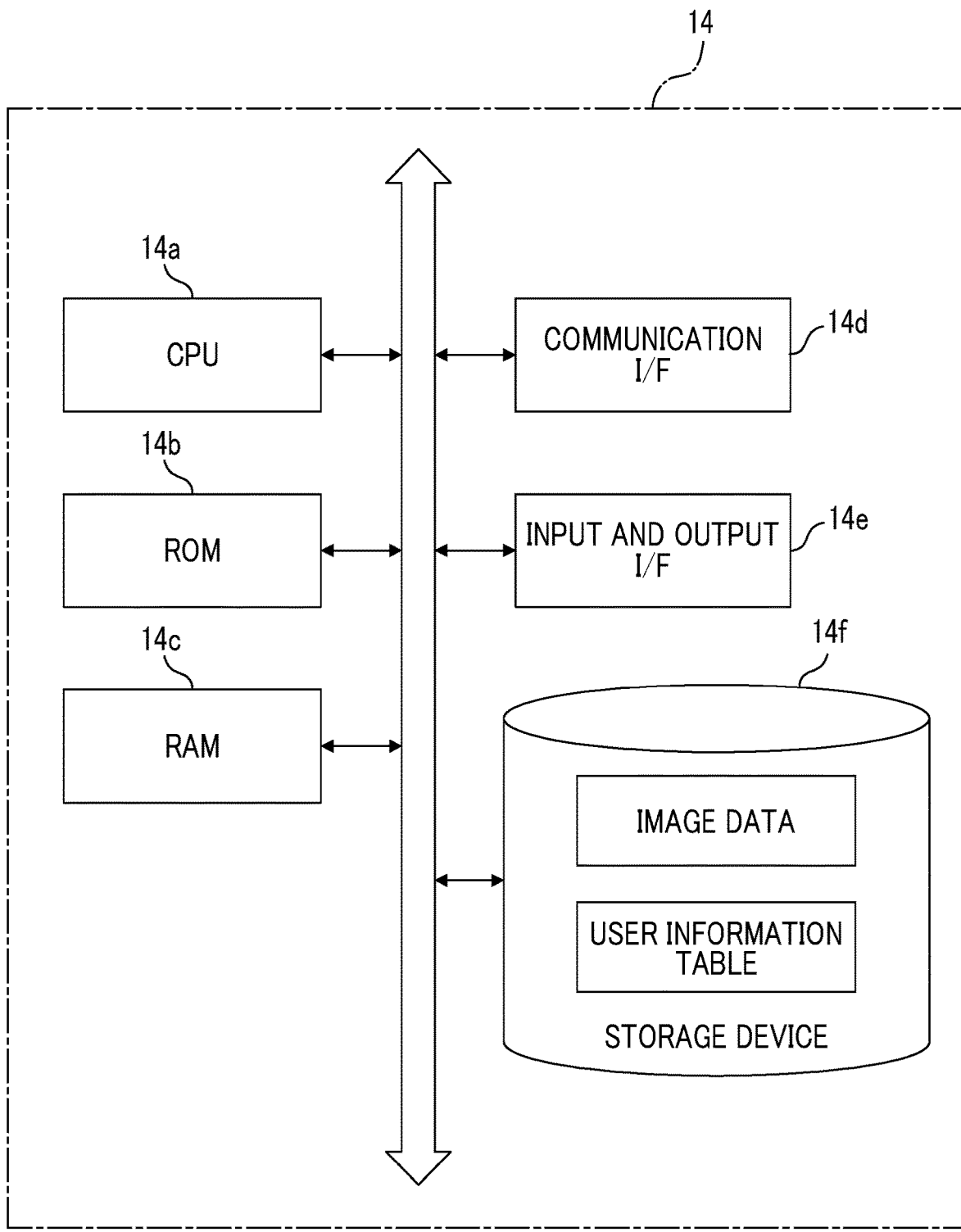
FIG. 3 is a block diagram illustrating a configuration of the relay device in the exemplary embodiment.

FIG. 3 is a block diagram illustrating a configuration of the relay device 14. The relay device 14 has a configuration as a server computer. The relay device includes one or a plurality of central processing units (CPUs) 14a, a read only memory (ROM) 14b, a random access memory (RAM) 14c, a communication interface (I/F) 14d, an input and output I/F 14e, and a storage device 14f. The constituent blocks are connected to a bus, and transmit and receive data to and from each other via the bus.

The CPU 14a executes various programs such as an operating system (OS) and applications. The ROM 14b stores a control program executed by the CPU 14a. The RAM 14c is used as a work memory or the like of the CPU 14a. The CPU 14a reads the control program stored in the ROM 14b and executes the control program with the RAM 14c as a work area. In a case where the CPU 14a executes the control program, various functions in the relay device 14, in particular, processing of inquiring available capacity of a cloud storage corresponding to an inquiry from the image processing apparatus 12, processing of receiving a response from the cloud storage and transferring the received response to the image processing apparatus 12, and processing of transferring image data in response to a storing request from the image processing apparatus 12 are realized.

The input and output I/F 14d is connected to an input device such as a keyboard or a mouse and to an output device (display device) such as a display.

The communication I/F 14e transmits and receives data to and from the user terminal 10, the image processing apparatus 12, the cloud storage A 16, and the cloud storage B 18 via the communication network 20. The communication I/F 14e receives a storing request including image data from the image processing apparatus 12 and transfers the image data to a cloud storage selected by the CPU 14a.

The storage device 14f includes a hard disk drive (HDD) or a solid state drive (SSD) and has a storage area. The storage device 14f temporarily stores image data, and stores an authentication table including information of a cloud storage capable of being used by a user and log-in information of the cloud storage.

The image processing apparatus 12 also has a similar configuration. Specifically, the image processing apparatus includes one or a plurality of CPUs, a ROM, a RAM, a communication I/F, an input and output I/F, an operation unit, a display unit, and a storage device. The CPU reads a control program stored in the ROM to execute the control program with the RAM as a work area. In a case where the CPU executes the control program, various functions in the image processing apparatus 12, in particular, processing of requiring the relay device 14 to perform storing in the cloud storage is realized.

Figure 4:
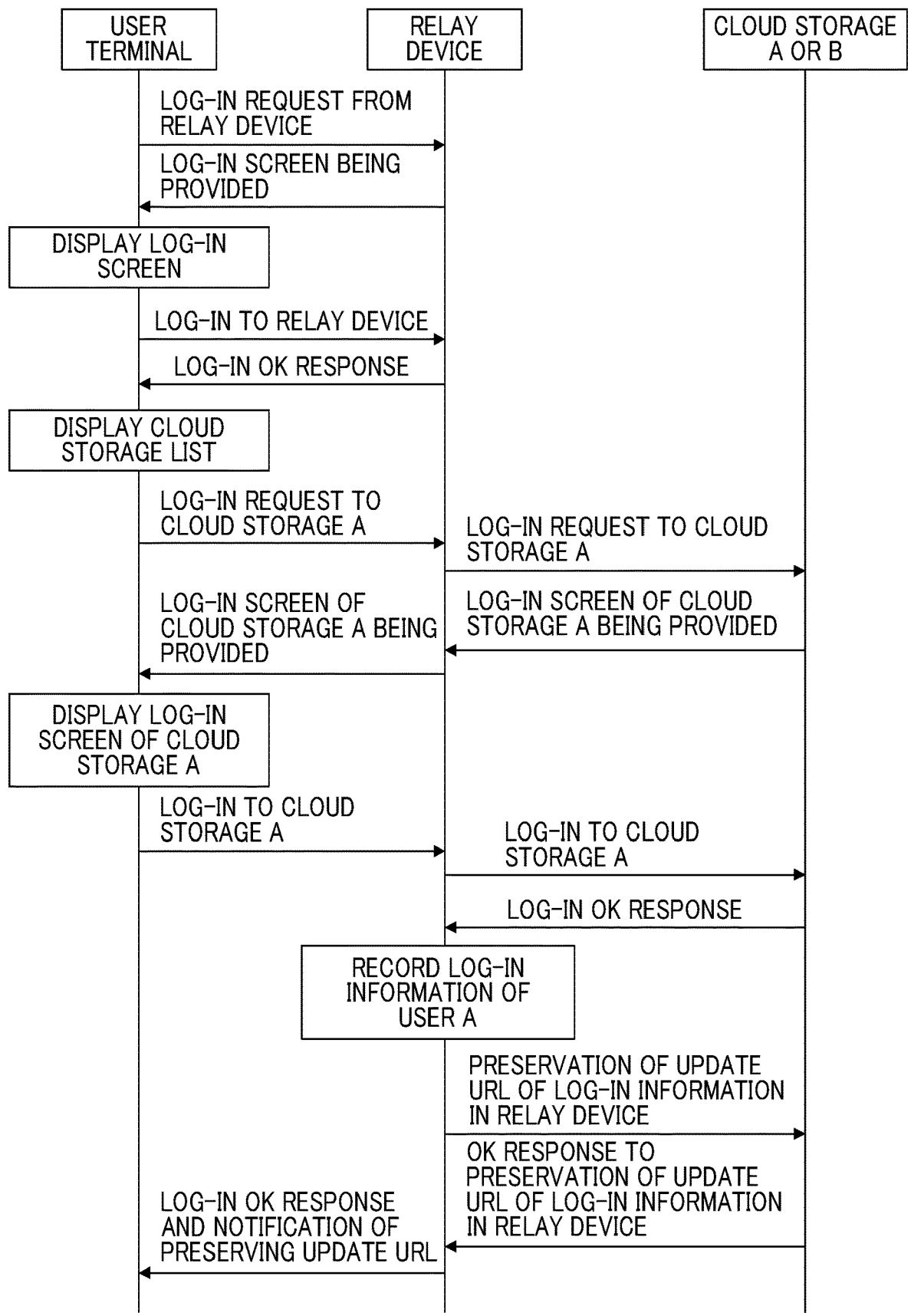
FIG. 4 is a sequence chart (part 1) of the exemplary embodiment.

FIG. 4 is a sequence chart illustrating processing in the exemplary embodiment. FIG. 4 illustrates a flow of data between the user terminal 10, the relay device 14, and the cloud storage A 16 or B 18.

Firstly, a user operates a user terminal 10 to require log-in to the relay device 14. In a case where the relay device receives the log-in request, the relay device 14 provides a log-in screen for the user terminal 10.

The user terminal 10 receives the log-in screen from the relay device 14 and displays the log-in screen in the display unit. The user inputs log-in information (user authentication information, for example, user ID, password, and the like) of the user by using the log-in screen and transmits the log-in information to the relay device 14. The relay device 14 receives the log-in information. In a case where it can be authenticated that the user is an authorized user, the relay device permits log-in and transmits a log-in OK response to the user terminal 10. The relay device 14 extracts a cloud storage capable of being used by the authenticated user and transmits a cloud storage list to the user terminal 10 as a response.

The user selects a desired cloud storage from the cloud storage list displayed in the user terminal 10. For example, it is assumed that the user selects the cloud storage A 16. The user terminal 10 transmits a log-in request to the cloud storage A 16 to the relay device 14.

In a case where the relay device receives the log-in request to the cloud storage A 16 from the user terminal 10, the relay device 14 transfers the log-in request to the cloud storage A 16. The cloud storage A 16 provides a log-in screen for the relay device 14, in response to the log-in request. The relay device 14 transfers the received log-in screen to the user terminal 10.

The user terminal 10 displays the received log-in screen in the display unit. The user inputs log-in information (user authentication information) by using the displayed log-in screen and transmits a log-in request to the relay device 14. The relay device 14 transfers the received log-in information (user authentication information) to the cloud storage A 16. The cloud storage A 16 performs user authentication by comparing the received user authentication information. In a case where it is authenticated that the user is an authorized user, the cloud storage A transmits a log-in OK response to the relay device 14.

In a case where the relay device receives the log-in OK response, the relay device 14 records the log-in information (user authentication information) of the user in an authentication table of the user information storage unit 142. The log-in information (user authentication information) includes a user ID, a password, an access token, and the like for each cloud service.

In a case where the relay device receives the log-in OK response, the relay device 14 instructs the cloud storage A 16 to generate and preserve an update URL (screen) of the relay device 14, which is used for updating log-in information (user authentication information) in the relay device 14. The instruction includes a URL as address information required for accessing the relay device 14 and the user information storage unit 142. The cloud storage A 16 generates and preserves the update URL (screen) of the relay device 14 in association with this user, in response to the instruction of generation and preservation. The update URL (screen) functions as an update unit. The cloud storage A 16 may display the preserved update URL (screen), for example, on the top screen.

In a case where the cloud storage A preserves the update URL (screen), the cloud storage A 16 transmits a preservation OK response to the relay device 14. In a case where the relay device receives the preservation OK response, the relay device transfers the log-in OK response and transmits a notification indicating that the update URL (screen) of the relay device 14 is preserved in the cloud storage A 16, to the user terminal 10 as a response.

With the above-described processing, the log-in information (user authentication information) for accessing the cloud storage A 16 is held in the relay device 14, and the update URL (screen) for updating the log-in information (user authentication information) in the relay device 14 is generated and preserved in the cloud storage A 16.

FIG. 5 illustrates an example of the authentication table stored in the user information storage unit 142 of the relay device 14. A user ID, a password, and an access token are stored for each cloud storage, in association with the cloud storage. "Others" indicate an expiration date of the access token, for example.

Figure 6:
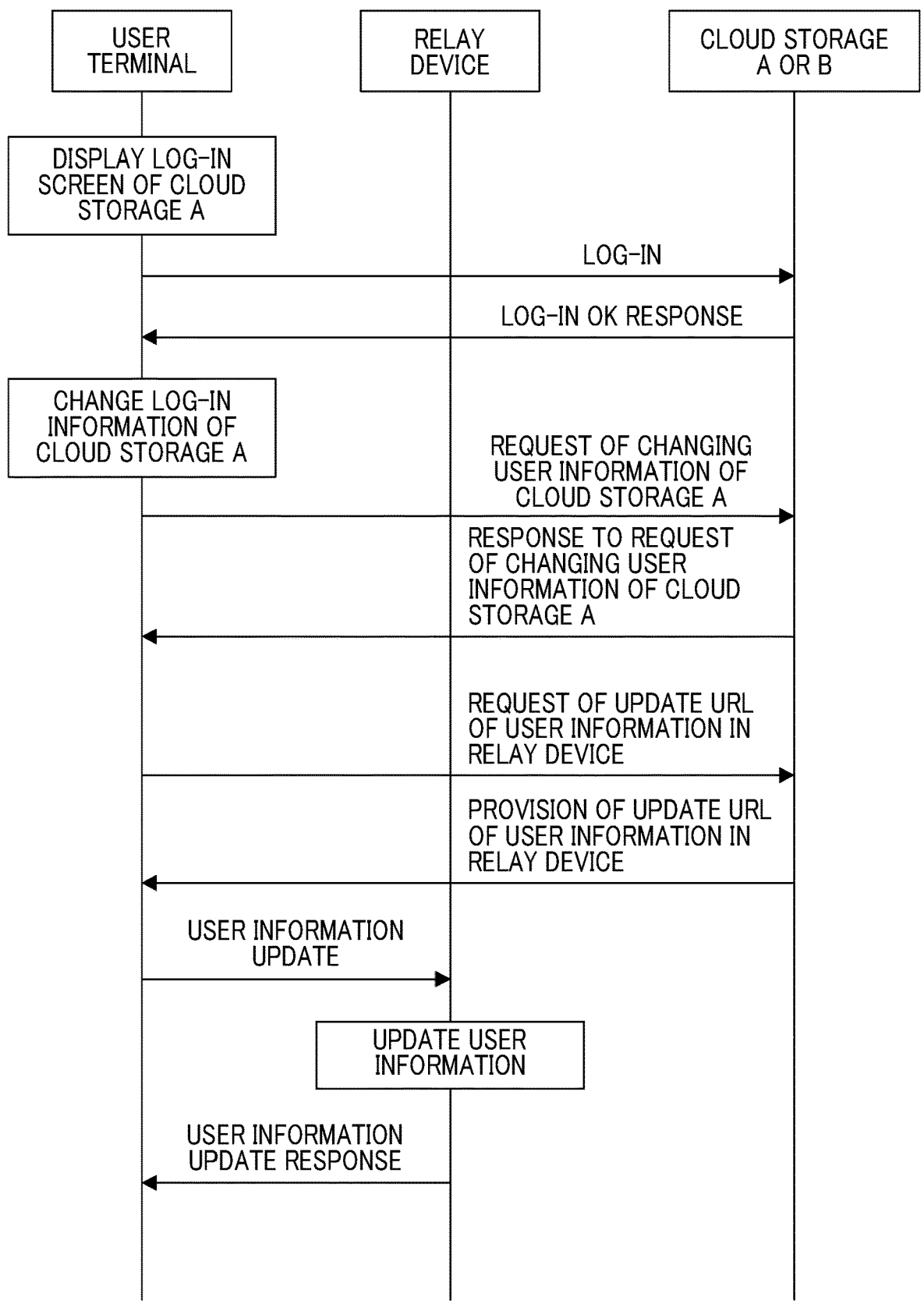
FIG. 6 is a sequence chart (part 2) of the exemplary embodiment.

FIG. 6 is a sequence chart in a case where a user accesses a cloud storage from the user terminal 10 without passing through the relay device 14 and updates log-in information (user authentication information), for example, updates a password. An update timing of the password may be randomly set.

In a case where the user attempts to access the cloud storage A 16, the user causes a log-in screen to be displayed in the user terminal 10. The user inputs log-in information (user authentication information) to the cloud storage A 16 and transmits a log-in request to the cloud storage A.

The cloud storage A 16 receives the log-in information (user authentication information) from the user terminal 10. In a case where it is authenticated that the user is an authorized user, the cloud storage A transmits a log-in OK response to the user terminal 10.

In a case where the user terminal receives the log-in OK response, the user terminal 10 transmits a change request of the log-in information (user authentication information) to the cloud storage A 16. For example, the user terminal 10 transmits a change request of the password to the cloud storage A 16. The change request includes the passwords before and after the change. In a case where the cloud storage A changes the log-in information (user authentication information), the cloud storage A 16 transmits a change request response to the user terminal 10.

Then, the user terminal 10 requests an update URL (screen) of the relay device 14 from the cloud storage A 16. The cloud storage A 16 transmits the update URL (screen) of the relay device 14, which has been preserved, to the user terminal 10 in response to the request. In a case where the update URL (screen) is displayed on the top screen of the cloud storage A 16, for example, a click operation may be performed on the URL displayed on the top screen.

The user terminal 10 accesses the authentication table in the relay device 14 by using the update URL (screen) provided from the cloud storage A 16. The user terminal requires an update of the log-in information (user authentication information) for the cloud storage A 16, which has been stored in the authentication table stored in the user information storage unit 142 of the relay device 14. For example, the user terminal requires an update to a new password. The relay device updates the log-in information (user authentication information) for the cloud storage A 16, which has been stored in the authentication table stored in the user information storage unit 142, in response to the update request from the user terminal 10. In a case where the update is completed, the relay device transmits an update OK response to the user terminal 10.

In a case where the user terminal requests the update of the log-in information (user authentication information) from the relay device 14, when the log-in information (user authentication information) which has been updated and transmitted to the cloud storage A 16 is held in the memory of the user terminal 10, the user terminal may require the update from the relay device 14 in a manner of employing the updated log-in information (user authentication information) itself. Thus, the user saves a labor on inputting the updated log-in information (user authentication information) again.

Figures 7A, 7B:
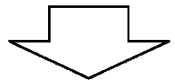
FIGS. 7A and 7B are diagrams illustrating an update of an authentication table in the exemplary embodiment.

FIGS. 7A and 7B illustrate processing of updating the authentication table stored in the user information storage unit 142. FIG. 7A illustrates the authentication table before the update. FIG. 7B illustrates the authentication table after the update. FIGS. 7A and 7B illustrate an example in which a password and an access token of a user for the cloud storage A 16 are updated. After the update, in a case where an access request to the cloud storage A 16 is received from the image processing apparatus 12, the relay device 14 reads the log-in information (user authentication information) from the updated authentication table and accesses the cloud storage A 16.

As described above, in the exemplary embodiment, in a case where the relay device holds log-in information, the relay device 14 causes the cloud storage A 16 to create and preserve an update URL (screen) for updating the log-in information. Thus, the user may easily access the relay device 14 by using the update URL (screen) and update the log-in information held in the relay device 14.

Exemplary Embodiment 2

In Exemplary Embodiment 1, the relay device 14 causes the cloud storage to create and preserve the update URL (screen). However, an update application program for updating log-in information in the relay device 14 may be installed on the cloud storage. The update application program starts in response to an update request of the log-in information from the user terminal 10, and automatically updates the authentication table stored in the user information storage unit 142 of the relay device 14. That is, the update application program functions as the update unit. The update application program may be transmitted from the relay device 14 and installed.

Figure 8:
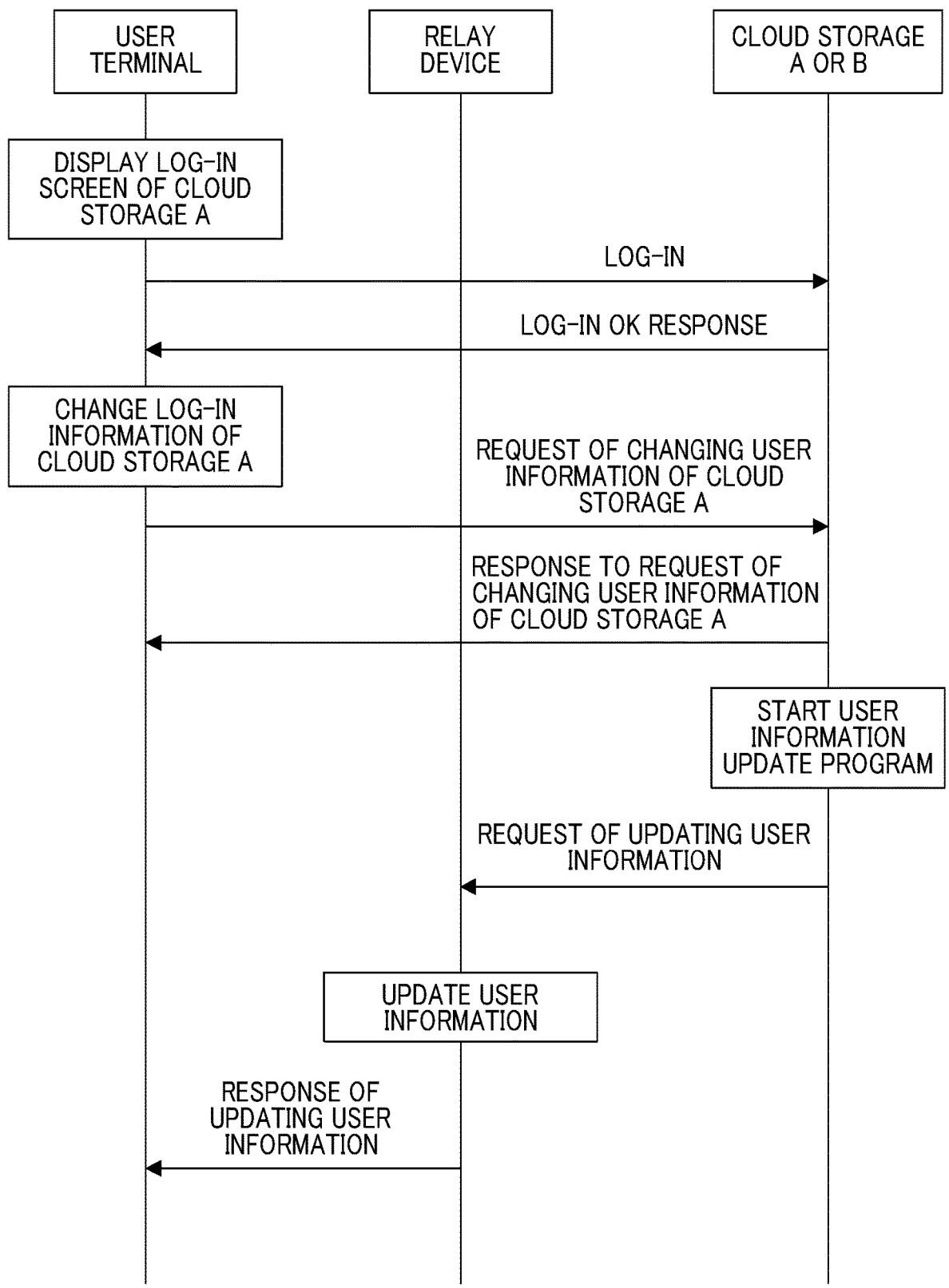
FIG. 8 is a sequence chart of another exemplary embodiment.

FIG. 8 is a sequence chart of an exemplary embodiment. FIG. 8 is a sequence chart in a case where a user accesses a cloud storage from the user terminal 10 without passing through the relay device 14 and updates log-in information, for example, updates a password.

In a case of accessing the cloud storage A 16, the user causes the user terminal 10 to display a log-in screen. The user inputs log-in information to the cloud storage A 16 and transmits a log-in request to the cloud storage A.

The cloud storage A 16 receives the log-in information from the user terminal 10. In a case where it is authenticated that the user is an authorized user, the cloud storage A transmits a log-in OK response to the user terminal 10.

In a case where the user terminal receives the log-in OK response, the user terminal 10 transmits a request of changing the log-in information to the cloud storage A 16. For example, the user terminal 10 transmits a change request of the password to the cloud storage A 16. The change request includes the passwords before and after the change. In a case where the cloud storage A changes the log-in information of the user, the cloud storage A 16 transmits a change request response to the user terminal 10. In a case where the cloud storage A changes the log-in information of the user, the cloud storage A 16 starts the update application program in response to the change request from the user, and transmits a change request of the user authentication information to the relay device 14. The change request includes the changed log-in information and information for specifying the cloud storage A 16.

In a case where the relay device receives the change request from the cloud storage A 16, the relay device 14 updates the authentication table stored in the user information storage unit 142 by using the changed log-in information included in the change request. In a case where the relay device updates the authentication table, the relay device 14 transmits an update response to the user terminal 10.

After the update, in a case where an access request to the cloud storage A 16 is received from the image processing apparatus 12, the relay device 14 reads the log-in information from the updated authentication table and accesses the cloud storage A 16.

As described above, in the exemplary embodiment, the update application program in the cloud storage starts to require the relay device 14 to update the user authentication information, in response to the change request from the user terminal 10, and the relay device 14 receives the request and updates the authentication table. Thus, it is not necessary that the user terminal 10 separately requires the relay device 14 to update the authentication table.

Exemplary Embodiment 3

Figure 9:
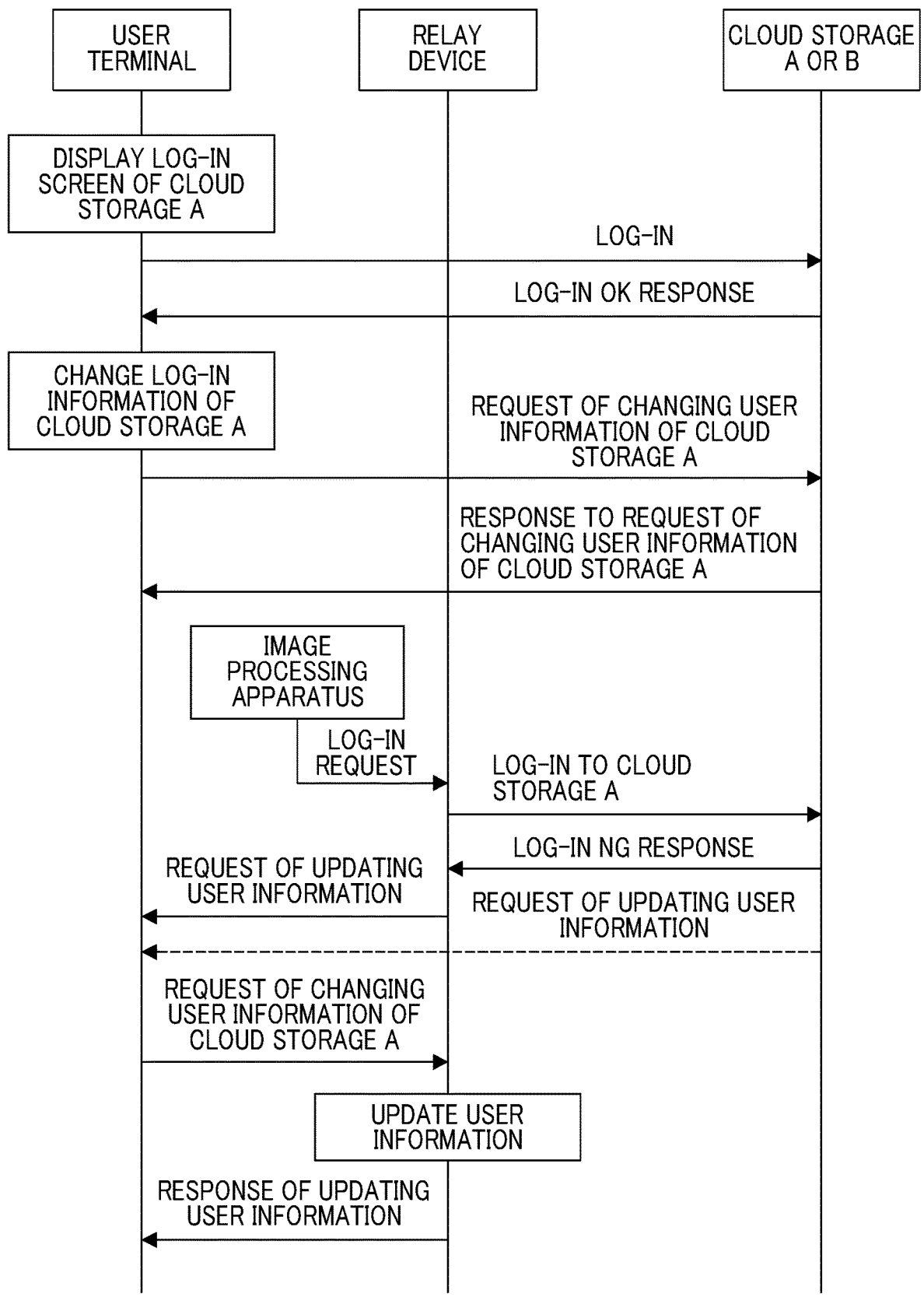
FIG. 9 is a sequence chart of still another exemplary embodiment.

FIG. 9 is a sequence chart of an exemplary embodiment. FIG. 9 is a sequence chart in a case where a user accesses a cloud storage from the user terminal 10 without passing through the relay device 14 and updates log-in information, for example, updates a password.

In a case of accessing the cloud storage A 16, the user causes the user terminal 10 to display a log-in screen. The user inputs log-in information to the cloud storage A 16 and transmits a log-in request to the cloud storage A.

The cloud storage A 16 receives the log-in information from the user terminal 10. In a case where it is authenticated that the user is an authorized user, the cloud storage A transmits a log-in OK response to the user terminal 10.

In a case where the user terminal receives the log-in OK response, the user terminal 10 transmits a request of changing the log-in information to the cloud storage A 16. For example, the user terminal 10 transmits a change request of the password to the cloud storage A 16. The change request includes the passwords before and after the change. In a case where the cloud storage A changes the log-in information of the user, the cloud storage A 16 transmits a change request response to the user terminal 10.

It is assumed that the user operates the image processing apparatus 12 to store image data in the cloud storage A 16 in this state. The image processing apparatus 12 requires the relay device 14 to log in to the cloud storage A 16. The relay device 14 attempts to log in to the cloud storage A 16 by using log-in information managed in the authentication table stored in the user information storage unit 142. However, since the authentication table stores the old log-in information itself which is not updated yet, the attempt to log in fails. The cloud storage A 16 transmits a log-in NG response to the relay device 14. The log-in NG response includes a notification indicating that a change of the log-in information is required. The notification functions as the update unit.

The relay device 14 transfers the log-in NG response and the notification indicating the change of the log-in information is required, to the user terminal 10. The user terminal 10 requires the relay device 14 to change the log-in information, in response to the notification. The request includes the updated log-in information. In a case where the relay device receives the request from the user terminal 10, the relay device 14 updates the authentication table stored in the user information storage unit 142.

The cloud storage A 16 may transmit a log-in NG response to the relay device 14, and notify the user terminal 10 of a change request of the log-in information as indicated by a broken line in FIG. 9. The request includes an update URL (screen) of the relay device 14. The notification functions as the update unit. The user terminal 10 requires the relay device 14 to change the log-in information, in response to the notification. In a case where the relay device receives the request from the user terminal 10, the relay device 14 updates the authentication table stored in the user information storage unit 142.

After the update, in a case where an access request to the cloud storage A 16 is received from the image processing apparatus 12, the relay device 14 reads the log-in information from the updated authentication table and accesses the cloud storage A 16.

Exemplary Embodiment 4

FIG. 10 is a sequence chart of an exemplary embodiment. FIG. 10 is a sequence chart in a case where a user accesses a cloud storage from the user terminal 10 without passing through the relay device 14 and updates log-in information, for example, updates a password.

In a case of accessing the cloud storage A 16, the user causes the user terminal 10 to display a log-in screen. The user inputs log-in information to the cloud storage A 16 and transmits a log-in request to the cloud storage A.

The cloud storage A 16 receives the log-in information from the user terminal 10. In a case where it is authenticated that the user is an authorized user, the cloud storage A transmits a log-in OK response to the user terminal 10.

In a case where the user terminal receives the log-in OK response, the user terminal 10 transmits a request of changing the log-in information to the cloud storage A 16. For example, the user terminal 10 transmits a change request of the password to the cloud storage A 16. The change request includes the passwords before and after the change. In a case where the cloud storage A changes the log-in information of the user, the cloud storage A 16 transmits a change request response to the user terminal 10.

It is assumed that the user operates the image processing apparatus 12 to store image data in the cloud storage A 16 in this state. The image processing apparatus 12 requires the relay device 14 to log in to the cloud storage A 16. The relay device 14 attempts to log in to the cloud storage A 16 by using log-in information managed in the authentication table stored in the user information storage unit 142. However, since the authentication table stores the old log-in information itself which is not updated yet, the attempt to log in fails. The cloud storage A 16 transmits a log-in NG response and a notification indicating a change of the log-in information is required, to the relay device 14.

The relay device 14 transfers the log-in NG response and the notification indicating the change of the log-in information is required, to the user terminal 10. The user terminal 10 requires the relay device 14 to change the log-in information, in response to the notification. The request includes the updated log-in information. In a case where the relay device receives the request from the user terminal 10, the relay device 14 updates the authentication table stored in the user information storage unit 142.

Similar to the case in FIG. 9, the cloud storage A 16 may transmit a log-in NG response to the relay device 14, and notify the user terminal 10 of a change request of the log-in information as indicated by a broken line in FIG. 10. The request includes an update URL (screen) of the relay device 14. The user terminal 10 requires the relay device 14 to change the log-in information, in response to the notification. In a case where the relay device receives the request from the user terminal 10, the relay device 14 updates the authentication table stored in the user information storage unit 142.

In a case where the relay device updates the authentication table, the relay device 14 transmits an update response to the user terminal 10. After that, regarding a cloud storage (cloud storage B in the example) other than the cloud storage A, the relay device automatically transmits a log-in request to the cloud storage B 18 even though there is no access request from the user terminal 10 or the image processing apparatus 12. The log-in request includes log-in information for the cloud storage B 18, which is recorded in the authentication table.

Here, it is assumed that the user also directly accesses the cloud storage B without passing through the relay device 14 and changes the log-in information, in addition to the cloud storage A 16. In this case, regarding the log-in information for the cloud storage A 16, the authentication table stored in the user information storage unit 142 of the relay device 14 is updated by the above processing. However, the log-in information for the cloud storage B 18 is not updated yet. Thus, an attempt to log in is refused although the attempt to log in is performed by using the old log-in information before the update. Therefore, the cloud storage B 18 transmits a log-in NG response and a notification indicating that a change of the log-in information is required, to the relay device 14.

The relay device 14 transfers the log-in NG response and the notification indicating the change of the log-in information is required, to the user terminal 10. The user terminal 10 requires the relay device 14 to change the log-in information, in response to the notification. The request includes the updated log-in information. In a case where the relay device receives the request from the user terminal 10, the relay device 14 updates the authentication table stored in the user information storage unit 142. Thus, the log-in information for the cloud storage B 18 in addition to the cloud storage A 16 is updated. The user takes notice in that, although an access request is transmitted to the cloud storage A 16, log-in information for another cloud storage is updated together.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A relay device comprising:
    a communication I/O interface that receives image data from an image processing apparatus; and
    a processor, configured to:
        control an update unit that updates log-in information to be generated in a cloud service device in a case where the received image data is transferred to the cloud service device, and the log-in information for the cloud service device is held such that an access to the cloud service device is denied due to log-in information for the cloud service device being changed by a user terminal; and
        update the log-in information which has been held in response to an operation of the update unit.

2. The relay device according to claim 1,
    wherein the update unit corresponds to an address display of the relay device or an application program for updating the log-in information.

3. The relay device according to claim 2,
    wherein the processor accepts an update of the log-in information which has been held, in response to the operation of the update unit.

4. The relay device according to claim 3,
    wherein, in a case where there is an attempt of an access from a user terminal, the processor verifies the log-in information in a manner of accessing a cloud service device other than the cloud service device by using the log-in information which has been held.

5. The relay device according to claim 1,
    wherein, in a case where the access to the cloud service device is denied, the update unit notifies the user terminal to access the relay device.

6. The relay device according to claim 5,
    wherein the processor accepts an update of the log-in information which as been held, in response to the operation of the update unit.

7. The relay device according to claim 6,
    wherein, in a case where there is an attempt of an access from the user terminal, the processor verifies the log-in information in a manner of accessing a cloud service device other than the cloud service device by using the log-in information which has been held.

8. A non-transitory computer readable medium storing a program causing a computer to execute a process, the process comprising:
    receiving image data from an image processing apparatus;
    transferring the received image data to a cloud service device and holding log-in information for the cloud service device in a storage device such that an access to the cloud service device is denied due to log-in information for the cloud service device being changed by a user terminal;

generating an update unit that updates the log-in information, in the cloud service device; and updating the log-in information which has been held in response to an update request from a user terminal or the cloud service device.

9. A relay device comprising:

receiving means for receiving image data from an image processing apparatus; and control means for controlling an update unit that updates log-in information to be generated in a cloud service device in a case where the received image data is transferred to the cloud service device, and the log-in information for the cloud service device is held such that an access to the cloud service device is denied due to log-in information for the cloud service device being changed by a user terminal and for updating the log-in information which has been held in response to an operation of the update unit.

* * * * *